US010840613B2

(12) United States Patent
Dordanas et al.

(10) Patent No.: US 10,840,613 B2
(45) Date of Patent: Nov. 17, 2020

(54) CABLE CONNECTION

(71) Applicant: Robert Bosch GmbH, Stuttgart (DE)

(72) Inventors: Dimitrios Dordanas, Ludwigsburg (DE); Klaus-Dieter Sulzberger, Sachsenheim (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 16/540,298

(22) Filed: Aug. 14, 2019

(65) Prior Publication Data
US 2020/0059012 A1 Feb. 20, 2020

(30) Foreign Application Priority Data

Aug. 15, 2018 (DE) .................. 10 2018 213 709

(51) Int. Cl.
*H01R 4/18* (2006.01)
*H01B 3/46* (2006.01)
*F01N 13/18* (2010.01)
*F01N 3/20* (2006.01)
*H01R 43/048* (2006.01)
*H01B 7/282* (2006.01)
(Continued)

(52) U.S. Cl.
CPC .............. *H01R 4/183* (2013.01); *F01N 3/208* (2013.01); *F01N 13/1838* (2013.01); *H01B 3/46* (2013.01); *H01R 43/048* (2013.01); H01B 7/28 (2013.01); H01B 7/282 (2013.01); H01B 7/285 (2013.01); H01B 7/288 (2013.01); H01B 7/2825 (2013.01); H01B 17/26 (2013.01); H01R 4/18 (2013.01); H01R 4/20 (2013.01); H01R 13/5202 (2013.01); H01R 13/5205 (2013.01); H01R 13/533 (2013.01); H01R 13/5808 (2013.01); H01R 2201/26 (2013.01); H02G 3/22 (2013.01)

(58) Field of Classification Search
CPC ........ H02G 3/22; H01R 4/20; H01R 13/5202; H01R 4/18; H01R 13/5808; H01R 4/183; H01R 43/048; H01R 2201/26; H01R 13/5205; H01R 13/533; H01B 17/26; H01B 3/46; H01B 7/28; H01B 1/2806; H01B 7/282; H01B 7/2825; H01B 7/285; H01B 7/288; F01N 13/1838; F01N 3/208
USPC ................................................. 174/151, 76
See application file for complete search history.

(56) References Cited

U.S. PATENT DOCUMENTS 5,301,594 A * 4/1994 Argazzi .................. F42B 33/06
141/19
2013/0318950 A1* 12/2013 Gottwald .............. F01N 3/2066
60/295
(Continued)

*Primary Examiner* — Abdullah A Riyami
*Assistant Examiner* — Justin M Kratt
(74) *Attorney, Agent, or Firm* — Michael Best & Friedrich LLP

(57) ABSTRACT

A cable connection (16) for a dosing module (6) for exhaust gas reduction, with a dosing module end (16b), which is designed for connection to the dosing module (6), and an end (16a) distant from the dosing module, comprising at least one electrical cable (19a, 19b) having at least one electrical conductor (28a, 28b) and a cable insulation (15a, 15b) surrounding the at least one electrical conductor (28a, 28b). The cable connection (16) is crimped in one region (26a) at the dosing module end (16b) of the cable connection (16). In the crimped region, a space (36) between the at least one electrical conductor (28a, 28b) and the cable insulation (15a, 15b) surrounding the at least one electrical conductor (28a, 28b) is filled with a silicone material (17a, 17b).

9 Claims, 4 Drawing Sheets

(51) Int. Cl.
*H01R 13/52* (2006.01)
*H01R 4/20* (2006.01)
*H01R 13/58* (2006.01)
*H01R 13/533* (2006.01)
*H02G 3/22* (2006.01)
*H01B 7/28* (2006.01)
*H01B 7/285* (2006.01)
*H01B 7/288* (2006.01)
*H01B 17/26* (2006.01)

(56) References Cited

U.S. PATENT DOCUMENTS

2017/0338005 A1\* 11/2017 Ito .............................. H02G 1/14
2019/0379144 A1\* 12/2019 Nomura ................... H01R 4/70

\* cited by examiner

CABLE CONNECTION

BACKGROUND OF THE INVENTION

The invention relates to a cable connection, especially a cable connection of a dosing module, which is installed for aftertreatment of exhaust gases of an internal combustion engine.

SCR (Selective Catalytic Reduction) systems are known for the reduction of nitrogen oxides ($NO_x$) contained in the exhaust gases of internal combustion engines, especially Diesel engines.

In these systems, an aqueous solution of urea as the reducing agent is injected into the exhaust gas line of the internal combustion engine upstream from an SCR catalyst by means of a so-called dosing module. In co-operation with the SCR catalyst, the urea contained in the aqueous urea solution reacts with the nitrogen oxides ($NO_x$) contained in the exhaust gases to form nitrogen ($N_2$) and water ($H_2O$), thereby reducing the nitrogen oxides contained in the exhaust gases.

The dosing module is actuated by a control device. For this, it is connected by an electrical cable connection to the control device.

SUMMARY OF THE INVENTION

One problem which the invention proposes to solve is to provide an improved electrical cable connection for a dosing module, especially a cable connection for connecting the dosing module to a control device.

According to one exemplary embodiment of the invention, a cable connection for a dosing module for exhaust gas reduction has a dosing module end, which is designed for connection to the dosing module, and an end distant from the dosing module, which is formed at a side of the cable connection facing away from the dosing module. The cable connection comprises at least one electrical cable having at least one electrical conductor and a cable insulation surrounding the at least one electrical conductor. The cable connection is crimped in one region at the dosing module end of the cable connection. In the crimped region, a space between the at least one electrical conductor and the cable insulation surrounding the at least one electrical conductor is filled with a silicone material.

Exemplary embodiments of the invention also comprise a dosing module for exhaust gas reduction, having a cable connection according to one exemplary embodiment of the invention, wherein the dosing module end of the cable connection is electrically connected to the dosing module.

Exemplary embodiments of the invention furthermore comprise an exhaust gas line of an internal combustion engine on which such a dosing module is mounted.

Exemplary embodiments of the invention also comprise a method for producing a cable connection for a dosing module for exhaust gas reduction. Such a method involves enclosing at least one electrical conductor with a cable insulation; filling a space between the at least one electrical conductor and the cable insulation with a silicone material in a region at a dosing module end of the cable connection; and crimping the region at the dosing module end of the cable connection.

The silicone material present in the crimped region between the electrical conductor and the cable insulation forms a capillary barrier which prevents the infiltration of media, such as liquid reducing agent and/or cooling water, and moisture.

In particular, the capillary barrier made of silicone material prevents media and/or moisture from penetrating through hairline cracks, which may be caused for example by the crimping at the dosing module end of the cable connection, into the cable connection and/or into the dosing module, which may corrode the electrical conductor and/or advance into further regions of the automotive electronics.

The electronic apparatus of the vehicle, especially the control device and the dosing module, are thus protected against damage which might be caused by media and/or liquid getting into the cable connection.

In one embodiment, the cable connection has at least two electrical cables, wherein in each of the electrical cables silicone material is introduced into the space between the electrical conductors and the surrounding cable insulation. In this way, even cable connections having more than one electrical cable are effectively protected against the penetration of media and/or moisture.

In one embodiment, the at least one electrical conductor is entirely embedded in the silicone material.

In one embodiment, the at least one electrical cable comprises multiple electrical conductors, which are embedded together in the silicone material in such a way that hollow spaces which are present between the electrical conductors are also filled with silicone material. In this way, even electrical cables having more than one electrical conductor are effectively protected against the penetration of media and/or moisture.

In one embodiment, the dosing module end of the cable connection is electrically and mechanically connected to a connecting module. The silicone material introduced according to the invention prevents media and/or moisture from getting into the cable connection and/or the dosing module through possible damaged areas, such as hairline cracks which might be produced in the cable insulation by the crimping, for example.

In one embodiment, a plug connector is provided at the end of the cable connection distant from the dosing module, making it possible to connect the dosing module by means of the cable connection to another electrical device, such as a control device.

In one embodiment, silicone material is also introduced into a region adjoining the end of the cable connection distant from the dosing module between the at least one electrical conductor and the cable insulation surrounding the electrical conductor. In this way, media and/or moisture are also reliably prevented from getting into the cable connection at the end of the cable connection distant from the dosing module.

BRIEF DESCRIPTION OF THE DRAWINGS

The invention shall now be explained with the aid of the enclosed figures.

DETAILED DESCRIPTION

Figure 1:
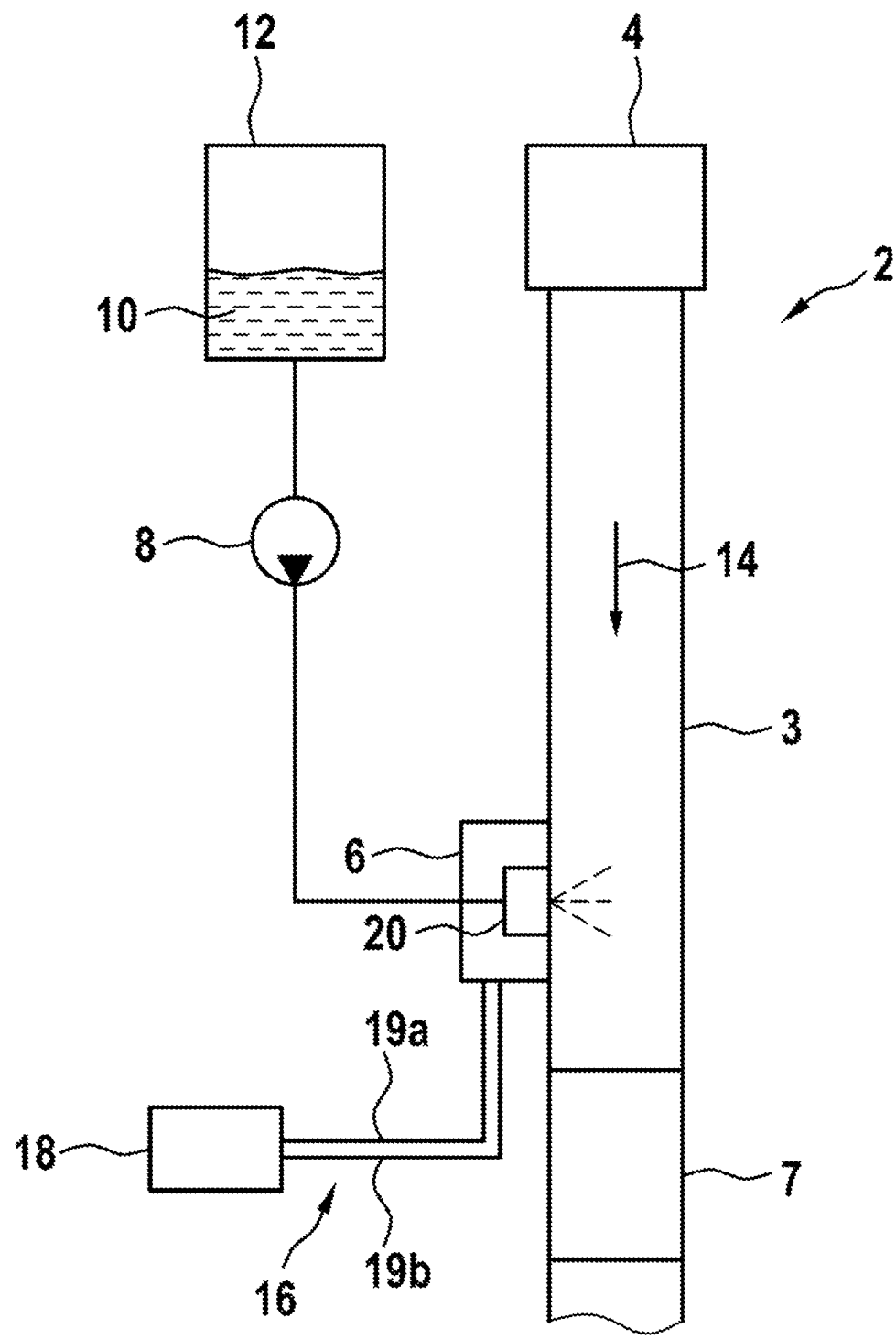
FIG. 1 shows an exhaust gas line of an internal combustion engine with a dosing module for the injecting of a reducing agent into the exhaust gas line in a schematic representation.

FIG. 1 shows in a schematic representation an internal combustion engine 4 with an exhaust gas line 2 and a dosing module 6 for injecting a reducing agent 10, especially an aqueous solution of urea, into the exhaust gas line 2.

The dosing module 6 is situated between the internal combustion engine 4 and an SCR catalyst 7, i.e., it is connected upstream from the SCR catalyst 7. The dosing module 6 comprises a dispensing valve 20, making it possible to inject, by suitable actuating of the dispensing valve 20, a desired quantity of reducing agent 10 into an exhaust gas duct 3 of the exhaust gas line 2. By a prefeed pump 8, the reducing agent 10 to be injected is withdrawn from a storage tank 12 and supplied to the dosing module 6, for example with a pressure of 2 to 3 bar. The dosing module 6 injects the reducing agent 10 with an elevated pressure into the exhaust gas duct 3 of the exhaust gas line 2. In the exhaust gas duct 3, the injected reducing agent 10 mixes with the exhaust gases 14 of the internal combustion engine 4 flowing through the exhaust gas duct 3 and reacts in the SCR catalyst 7, situated downstream from the dosing module 6, with the nitrogen oxides ($NO_x$) contained in the exhaust gases 14, thereby reducing them to $N_2$ and $H_2O$.

The dosing module 6 is connected across an electrical cable connection 16, having two electrical cables 19a, 19b, to a control device 18. The control device 18 is designed to actuate the dosing module 6 each time in accordance with the current operating state of the internal combustion engine 4.

The electrical cables 19a, 19b are connected across a cable adapter 22 to the dosing module 6.

Figure 2:
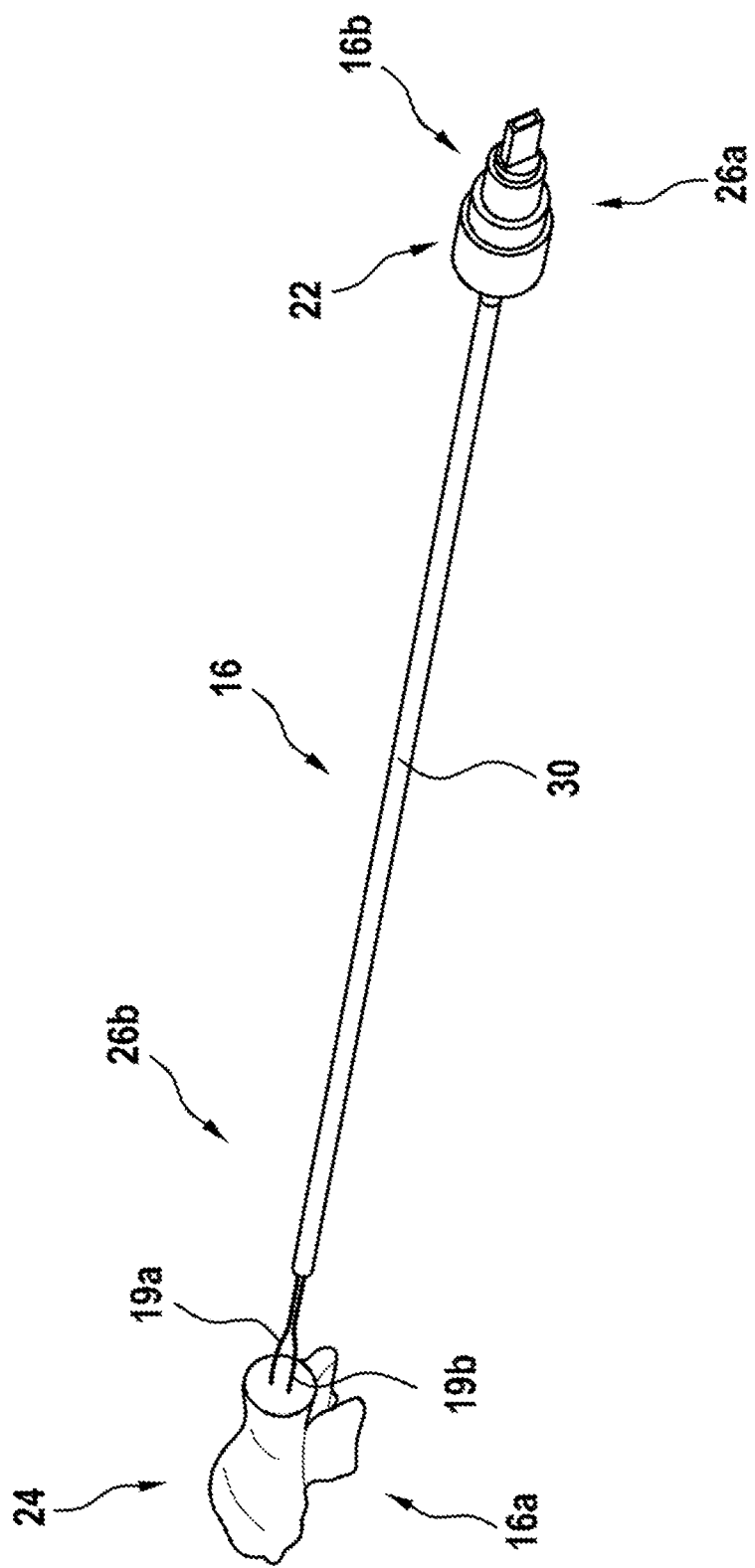
FIG. 2 shows a perspective view of an electrical cable connection according to one exemplary embodiment of the invention.

FIG. 2 shows a perspective view of an electrical cable connection 16 according to one exemplary embodiment of the invention with a dosing module-side region 26a and a region 26b distant from the dosing module.

The cable connection 16 comprises two electrical cables 19a, 19b. The two electrical cables 19a, 19b are at least partly surrounded by a common jacket 30.

At a dosing module end 16b, the electrical cable connection 16 is provided with a connecting module 22, which is designed for the electrical connecting of the cable connection 16 to a dosing module 6, not shown in FIG. 2.

At an opposite end 16a of the cable connection 16 facing away from the dosing module 6 (not shown), a plug connector 24 is provided, making it possible to connect the end 16a of the cable connection 16 distant from the dosing module electrically to a control device 18, for example, not shown in FIG. 2.

Figure 3:
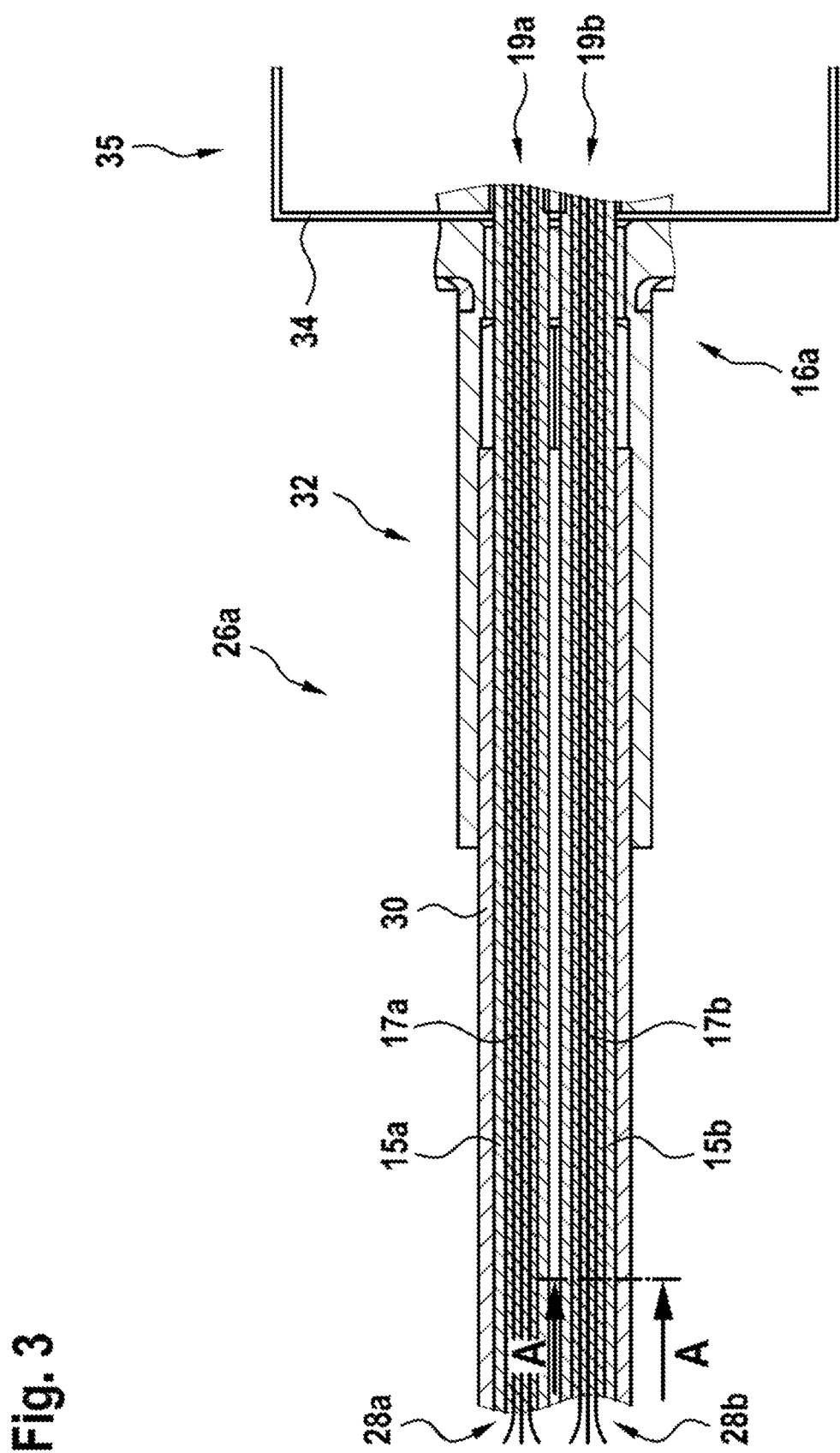
FIG. 3 shows a schematic sectional view of a dosing module end of a cable connection according to one exemplary embodiment of the invention.

FIG. 3 shows a schematic sectional view of a region 26a at the dosing module end 16b of a cable connection 16 according to one exemplary embodiment of the invention.

In the exemplary embodiment shown in FIG. 3, the cable connection 16 comprises two electrical cables 19a, 19b. The skilled person understands that the cable connection 16 may also have more or fewer than two electrical cables 19a, 19b. Each of the two electrical cables 19a, 19b respectively contains multiple electrical conductors, such as stranded conductors, 28a, 28b.

Figure 4:
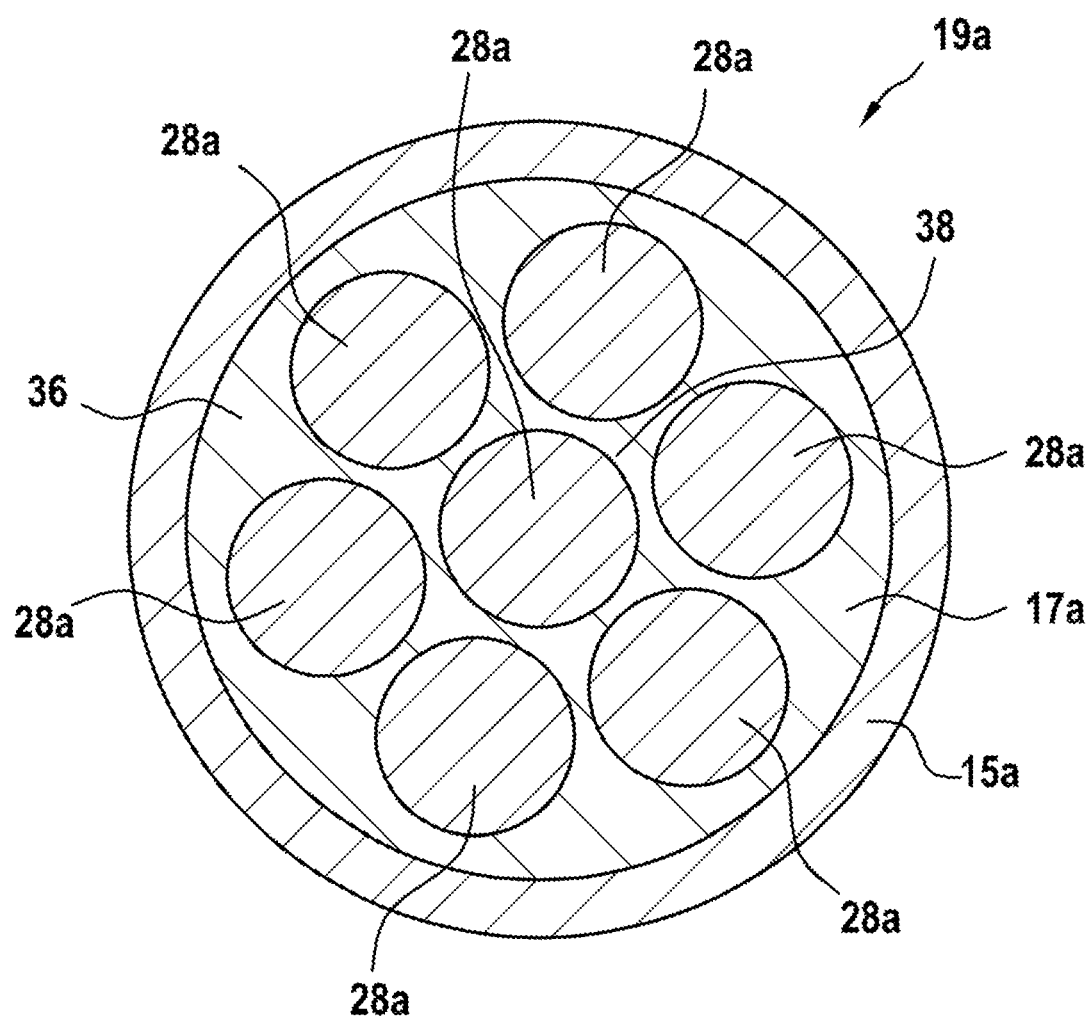
FIG. 4 shows a section through an electrical cable of a cable connection according to the invention orthogonally to the section shown in FIG. 3.

FIG. 4 shows a section through an electrical cable 19a of the cable connection 16 along the plane A-A (see FIG. 3), i.e., orthogonally to the section represented in FIG. 3.

The electrical conductors 28a, 28b of the two electrical cables 19a, 19b are respectively enclosed by a cable insulation 15a, 15b made from an electrically insulating material, especially a suitable plastic material.

The space between the electrical conductors 28a, 28b and the cable insulation 15a, 15b is filled respectively with a silicone material 17a, 17b. The silicone material 17a, 17b entirely encloses the electrical conductors 28a, 28b, so that the electrical conductors 28a, 28b are embedded in the silicone material 17a, 17b. The silicone material 17a, 17b in particular fills not only the outer space 36 between the electrical conductors 28a, 28b and the surrounding cable insulation 15a, but also all the hollow spaces, especially also the internal spaces 38 between the individual electrical conductors 28a, 28b (see FIG. 4).

At least one partial region 26a of the cable connection 16 at the dosing module side is crimped by a crimp element 32, such as a hexagonal crimp element 32, which lies against a housing wall 34 of the dosing module 35.

The silicone material 17a, 17b prevents media and/or moisture from being able to penetrate into the electrical conductors 28a, 28b, especially if the cable insulation 15a, 15b is damaged and has hairline cracks, for example, which may be caused e.g. by the crimping.

The risk of failure or even damaging of the dosing module and/or corrosion of the electrical conductors 28a, 28b by the penetration of media, especially reducing agent or cooling water, rain water, and/or other moisture through (hairline) cracks in the cable insulation 15a, 15b may be significantly reduced in this way in an economical manner.

The invention claimed is:

1. A cable connection (16) for a dosing module (6) for exhaust gas reduction, the cable connection comprising a dosing module end (16b), which is configured to be connected to the dosing module (6), and an end (16a) distant from the dosing module,
   wherein the cable connection (16) also comprises at least one electrical cable (19a, 19b) having at least one electrical conductor (28a, 28b) and a cable insulation (15a, 15b) surrounding the at least one electrical conductor (28a, 28b);
   wherein the cable connection (16) is crimped in a crimped region (26a) at the dosing module end (16b) of the cable connection (16); and
   wherein in the crimped region, a space (36) between the at least one electrical conductor (28a, 28b) and the cable insulation (15a, 15b) surrounding the at least one electrical conductor (28a, 28b) is filled with a silicone material (17a, 17b).

2. The cable connection (16) according to claim 1, wherein the at least one electrical cable includes at least two electrical cables (19a, 19b), wherein the electrical conductor (28a, 28b) in each of the at least two electrical cables (19a, 19b) is enclosed by a silicone material (17a, 17b).

3. The cable connection (16) according to claim 1, wherein the at least one electrical cable (19a, 19b) comprises at least two electrical conductors (28a, 28b), and wherein a space (38) between the at least two electrical conductors (28a, 28b) is filled with the silicone material (17a, 17b).

4. The cable connection (16) according to claim 1, wherein the at least one electrical conductor (28a, 28b) is connected to a connecting module (22) at the dosing module end (16b) of the cable connection (16).

5. The cable connection (16) according to claim 1, wherein a plug connector (22) is provided at the end (16a) of the cable connection (16) distant from the dosing module.

6. The cable connection (16) according to claim 1, wherein the space (36) between the at least one electrical conductor (28*a*, 28*b*) and the surrounding cable insulation (15*a*, 15*b*) is filled with a silicone material (17*a*, 17*b*) also in a region (26*b*) at the end (16*a*) of the cable connection (16) distant from the dosing module.

7. A dosing module (6) configured to inject a reducing agent (10) into the exhaust gas line (2) of an internal combustion engine (4), the dosing module having a cable connection (16) according to claim 1.

8. The dosing module (6) according to claim 7, wherein the dosing module end (16*b*) of the cable connection (16) is electrically connected to the dosing module (6).

9. An exhaust gas line (2) of an internal combustion engine (4) having a dosing module (6) according to claim 7.

\* \* \* \* \*